(12) United States Patent  (10) Patent No.: US 7,575,329 B2
Bennett, Jr.  (45) Date of Patent: Aug. 18, 2009

(54) COMPACT ILLUMINATION AND MAGNIFICATION DEVICE

(75) Inventor: James F. Bennett, Jr., Nantucket, MA (US)

(73) Assignee: LightWedge, LLC, Nantucket, MA (US)

( * ) Notice: Subject to any disclaimer, the term of this patent is extended or adjusted under 35 U.S.C. 154(b) by 509 days.

(21) Appl. No.: 11/305,352

(22) Filed: Dec. 19, 2005

(65) Prior Publication Data

US 2007/0139621 A1   Jun. 21, 2007

(51) Int. Cl.
  *G03B 29/00* (2006.01)
  *F21L 4/00* (2006.01)
(52) U.S. Cl. .......................... 353/43; 362/157
(58) Field of Classification Search .............. 353/43, 353/122; 362/58.157; D26/37
  See application file for complete search history.

(56) References Cited

U.S. PATENT DOCUMENTS

| | | | |
|---|---|---|---|
| 1,556,510 A | 10/1925 | King | |
| 2,122,753 A | 7/1938 | Ridabock | |
| 2,744,192 A | 5/1956 | Rosenthal | |
| 2,771,003 A | 11/1956 | Lyndall et al. | |
| 2,803,919 A | 8/1957 | Abraham | |
| 3,140,883 A | 7/1964 | Anthony | |
| 3,409,347 A | 11/1968 | Vogel | |
| D217,506 S | 5/1970 | Knoetgen | |
| 3,793,058 A | 2/1974 | Rostoker | |
| 3,808,415 A | 4/1974 | Hurst | |
| 3,945,717 A * | 3/1976 | Ryder et al. | 359/800 |
| 4,388,678 A | 6/1983 | Turner | |
| 4,432,042 A | 2/1984 | Zeller | |
| 4,598,340 A | 7/1986 | Dwosh et al. | |
| 4,680,681 A | 7/1987 | Fisherman et al. | |
| 4,751,615 A | 6/1988 | Abrams | |
| 4,833,443 A | 5/1989 | Siew | |

(Continued)

FOREIGN PATENT DOCUMENTS

GB  1 232 977  5/1971

(Continued)

OTHER PUBLICATIONS

Magnifying America, Lighted Bar Magnifier, http://www.magnifyingstore.com/browseproducts/Lighted-Bar-Magnifier.html, pp. 1-2.

(Continued)

*Primary Examiner*—Hung Henry Nguyen
(74) *Attorney, Agent, or Firm*—Nixon Peabody, LLP

(57) ABSTRACT

A compact and portable device uniformly illuminates and magnifies the words, images, or other information on a surface, such as the words on a page of a book, while minimizing the amount of light transmitted beyond or away from the illuminated surface. The device employs a light transmitting body formed of a transparent light conductive material and a magnifying lens. The device also employs a housing with a light source and a power source for powering the light source. To receive and deflect light from the light source onto the underlying surface, the light transmitting body is configured to have a wedge shape tapering from a thicker edge to a thinner edge. The wedge-shaped light transmitting body and the magnifying lens may be integrally formed to allow seamless transmission of light between the light transmitting body and the magnifying lens.

30 Claims, 8 Drawing Sheets

U.S. PATENT DOCUMENTS

| | | | |
|---|---|---|---|
| 5,113,327 A * | 5/1992 | Levy | 362/157 |
| 5,163,748 A | 11/1992 | Messinger | |
| 5,183,324 A | 2/1993 | Thomas | |
| 5,280,416 A | 1/1994 | Hartley et al. | |
| 5,337,224 A | 8/1994 | Field et al. | |
| 5,381,310 A | 1/1995 | Brotz | |
| 5,412,896 A | 5/1995 | Morgan | |
| 5,442,528 A | 8/1995 | Vandenbelt | |
| 5,471,347 A | 11/1995 | Galiani | |
| 5,499,165 A | 3/1996 | Holmes, Jr. | |
| D372,924 S | 8/1996 | Fisherman | |
| 5,613,751 A | 3/1997 | Parker et al. | |
| 5,639,156 A | 6/1997 | Broxson | |
| 5,642,234 A * | 6/1997 | Altman et al. | 359/802 |
| 5,695,271 A | 12/1997 | Zeller | |
| 5,764,493 A | 6/1998 | Liao | |
| 5,813,748 A | 9/1998 | Maxymych | |
| D401,371 S | 11/1998 | Chen | |
| 5,860,722 A | 1/1999 | Tai et al. | |
| 5,905,583 A | 5/1999 | Kawai et al. | |
| 5,915,855 A | 6/1999 | Murase et al. | |
| 5,921,664 A | 7/1999 | Lee | |
| D414,574 S | 9/1999 | Chen | |
| 6,022,119 A | 2/2000 | Booty, Jr. | |
| 6,073,374 A | 6/2000 | Tingmo | |
| 6,076,294 A | 6/2000 | Durbin | |
| D433,170 S | 10/2000 | Chan | |
| 6,213,618 B1 | 4/2001 | Dobbin et al. | |
| D443,370 S | 6/2001 | Yu | |
| 6,250,767 B1 | 6/2001 | Kusafuka et al. | |
| 6,273,577 B1 | 8/2001 | Goto et al. | |
| 6,305,109 B1 | 10/2001 | Lee | |
| 6,360,030 B1 | 3/2002 | Kawai et al. | |
| 6,454,423 B1 | 9/2002 | Suzuki et al. | |
| 6,464,366 B1 | 10/2002 | Lin et al. | |
| D467,672 S | 12/2002 | Galli | |
| 6,540,382 B1 | 4/2003 | Simon | |
| D477,432 S | 7/2003 | Parsons | |
| 6,626,552 B2 | 9/2003 | Uehara et al. | |
| 6,769,618 B1 | 8/2004 | Finkelstein | |
| D496,479 S | 9/2004 | Ashfield | |
| D501,266 S | 1/2005 | Harris et al. | |
| D501,781 S | 2/2005 | Galli | |
| 6,951,403 B2 | 10/2005 | Bennett, Jr. | |
| 2003/0081407 A1 | 5/2003 | Bennett, Jr. | |

FOREIGN PATENT DOCUMENTS

| | | |
|---|---|---|
| JP | 120187/93 | 2/1953 |
| JP | 01-274302 | 11/1989 |
| JP | 7-19907/95 | 4/1995 |
| JP | 07-287228 | 10/1995 |
| JP | 10-082915 | 3/1998 |
| JP | 10-247412 | 9/1998 |
| JP | 2001-118418 | 4/2001 |
| JP | 2001-210129 | 8/2001 |

OTHER PUBLICATIONS

Barnes & Noble.com-Lighted Pop Up Magnifier-Ultra-Optix-Other Format, Lighted Pop Up Magnifier, http://search.barnesandnoble.com/booksearch/isbninquiry.asp?cds2pid=9532&FMT=C&isbn=064161750X, pp. 1-2, 1997-2005.

Lighted Pop-Up Magnifier, http://a1204.g.akamai.net/7/1204/1401/05050516011/images.barnesandnoble.com/images/9610000/9610368.jpg.

Compact Lighted Pop-Up Magnifier-Includes batteries, http://www.amazon.com/gp/product/images/B0001UMQ5Q/ref=dp_product-image-only...

Magnifiers, Apollo, High-Powered Round Lighted Magnifier, http://www.acco.com/productdetail.aspx?s=0&pid=V27542.

Magnifiers, Apollo, Lighted Compact Magnifier, http://www.acco.com/productdetail.aspx?s=0&pid=V27539.

Menu-Mate, Menu-Mate Product Details, http://www.menu-mate.com/product.htm, pp. 1-2.

James F. Bennett, Jr., "Compact Device For Illumination A Flat Surface",U.S. Appl. No. 29/238,922, filed Sep. 23, 2005. Specification(drawings and claims).

\* cited by examiner

COMPACT ILLUMINATION AND MAGNIFICATION DEVICE

BACKGROUND OF INVENTION

The present invention relates generally to a portable illumination and magnification device, and more particularly to a portable device adapted for uniformly illuminating and magnifying words, images, or other information on a surface, such as a page of a book, while minimizing the amount of light transmitted beyond, or away from, the illuminated surface.

DESCRIPTION OF RELATED ART

Portable illumination and magnification devices are known and have various configurations. Such devices are normally used to improve lighting and. facilitate viewing of printed materials, such as restaurant menus, theatre programs, or car maps with small type fonts, in dark or poorly lit environments.

Several commercially available devices employ a convex magnifying lens, which is usually rectangular, with a single light bulb positioned near the middle of the bottom edge of the magnifying lens, the light bulb being powered by a simple switch. A disadvantage of these devices is that the point light source fails to provide substantially uniform illumination because areas closer to the light source are more brightly lit. Moreover, any attempt to provide adequate lighting for the entire magnified area by increasing the lumens of the light bulb increases the likelihood that the emitted light may disturb others in the vicinity, especially because the single bulb also emits light that is not diffused. Such devices must generally be held at a distance from the viewed surface to obtain sufficient magnification and to allow the light from the single light bulb to spread over the surface. As a result, the light can disadvantageously reflect off the viewed surface to the surroundings.

Another commercially available device employs a flat, rectangular Fresnel magnifying lens created by a series of concentric contours in the plastic lens. Rather than a point light source, an elongate light source, activated by a push-button, is positioned at the bottom edge of the magnifying lens. Although a Fresnel lens allows the magnifying lens to be significantly thin, a known disadvantage of using a Fresnel lens is that the quality of the image is not nearly as good as that from a continuous lens, such as the convex lenses used in the devices previously discussed above. The inherent distortion of a Fresnel lens may mitigate the benefits of the magnification it provides, particularly in environments where the lighting is less than optimal. In addition, like the point light source of the devices above, the elongate light source suffers from the disadvantage of non-uniform lighting, because areas closer to the light source are more brightly lit. Increasing the amount of light to cover the magnified area may also increase the amount of light emitted beyond the magnified area. Furthermore, as with the devices noted above, this particular device must also be held at a distance from the surface being viewed, so light is more likely to reflect off the viewed surface and be transmitted to the surroundings.

Yet another commercially available device employs a semi-cylindrical magnifying lens, also known as a barrel magnifier, with a light source at one end of the lens. The barrel magnifier is made of a light conductive material so the light from the light source is transmitted evenly through the body of the barrel magnifier. Unlike the devices previously described above, this device provides uniform illumination and more diffused light. However, because the semi-cylindrical shape of the barrel magnifier is parallel to the surface being magnified, most of the light is transmitted parallel to the surface to the opposite end of the barrel magnifier and very little light is directed toward the surface. Indeed, the opposite end of the barrel magnifier requires an opaque coating in order to prevent the emission of light from this end and unintended illumination of the surroundings. Moreover, this device fails to effectively utilize all of the light available for illuminating the magnified area, thus decreasing its utility.

BRIEF SUMMARY OF THE INVENTION

To overcome the limitations of the prior art and provide additional advantageous features, the present invention provides a portable device that uniformly illuminates and magnifies words, images, or other information on a surface, while minimizing the amount of light transmitted beyond, or away from, the illuminated surface.

The present invention provides a device that has a light source, a light transmitting body, and a magnifying lens, the device being dimensioned and configured to overlie a surface. The light transmitting body is made of a light conductive material that transmits light uniformly through the body. In order to receive and deflect light from the light source onto the underlying surface, the light transmitting body is also configured to have a wedge shape tapering from a thicker edge to a thinner edge. The light is received at the thicker edge and is conducted into, and through, the light transmitting body, where the angled surface of the wedge deflects the light onto the surface to be illuminated. The bottom surface facing the surface being viewed may be generally flat so that the device can be used while placed flat on the surface, in order to minimize any reflection of light from the surface to the surroundings.

The magnifying lens may be an elongate lens, such as a barrel magnifying lens, positioned adjacent to a tapering side edge of the light transmitting body. When the magnifying lens is an elongate lens, a favorable embodiment of the magnifying lens has a tapered shape so that any light traveling through the magnifying lens is deflected toward the viewed surface, in a manner similar to the wedge-shaped light transmitting body. Alternatively, the magnifying lens may be a convex magnifying lens, positioned within the light transmitting body. In general, however, the present invention can utilize various types of magnifying lenses, and is not limited to the use of the barrel magnifiers or convex magnifying lenses.

Preferably, the magnifying lens is made of a light conductive material that transmits light uniformly through the magnifying lens. More preferably, light transmitted through the light transmitting body is transmitted through the magnifying lens, or vice versa. In particular, it is advantageous to have a light transmitting body integrally formed with the magnifying lens from a single material.

The light source may be one or more light bulbs, and the light transmitting body may have a corresponding number of recesses configured to receive each light bulb. Each recess substantially surrounds the bulb so that the light from the light bulb is emitted three-dimensionally into, and through, the light transmitting body. Optionally, the magnifying lens may also have recesses configured to receive the light bulbs. As discussed above, an advantageous embodiment combines the light transmitting body and the magnifying lens in such a way that light transmitted through the light transmitting body also, travels through the magnifying lens, or vice versa. Thus, a single light bulb can transmit light uniformly through both the light transmitting body and the magnifying lens.

Preferably, the power source for the light source may be one or more batteries. The light transmitting body and/or the magnifying lens may be implemented to have one or more recesses configured to receive a portion of the batteries in order to promote the compact and portable nature of the device.

The light source and the power source for the light source are positionable in a housing which is secured to the light transmitting body, and optionally, the magnifying lens. The housing is positioned to allow the light source to emit light into the thicker edge of the light transmitting body, and optionally, into the magnifying lens. The housing, the light transmitting body, and the magnifying lens may have mating projections, receptacles, fastening mechanisms, or other structural features for securing the housing to the light transmitting body and/or the magnifying lens. A favorable embodiment secures the housing to a transparent light conducting extension extending from the light transmitting body and the magnifying lens. In this favorable embodiment, the extension may have recesses to receive the power source as well as light bulbs which emit light into both the light transmitting body and one end of the magnifying lens.

DETAILED DESCRIPTION OF THE INVENTION

The following presents a detailed description of a portable device that facilitates the viewing of words, images, or other information on a surface, particularly in dark or poorly lit environments. The present invention directs light from a light source uniformly onto the surface to illuminate and to magnify the words, images, or other information on the surface, while minimizing or reducing the amount of light transmitted beyond, or away from, the illuminated surface.

Figure 1:
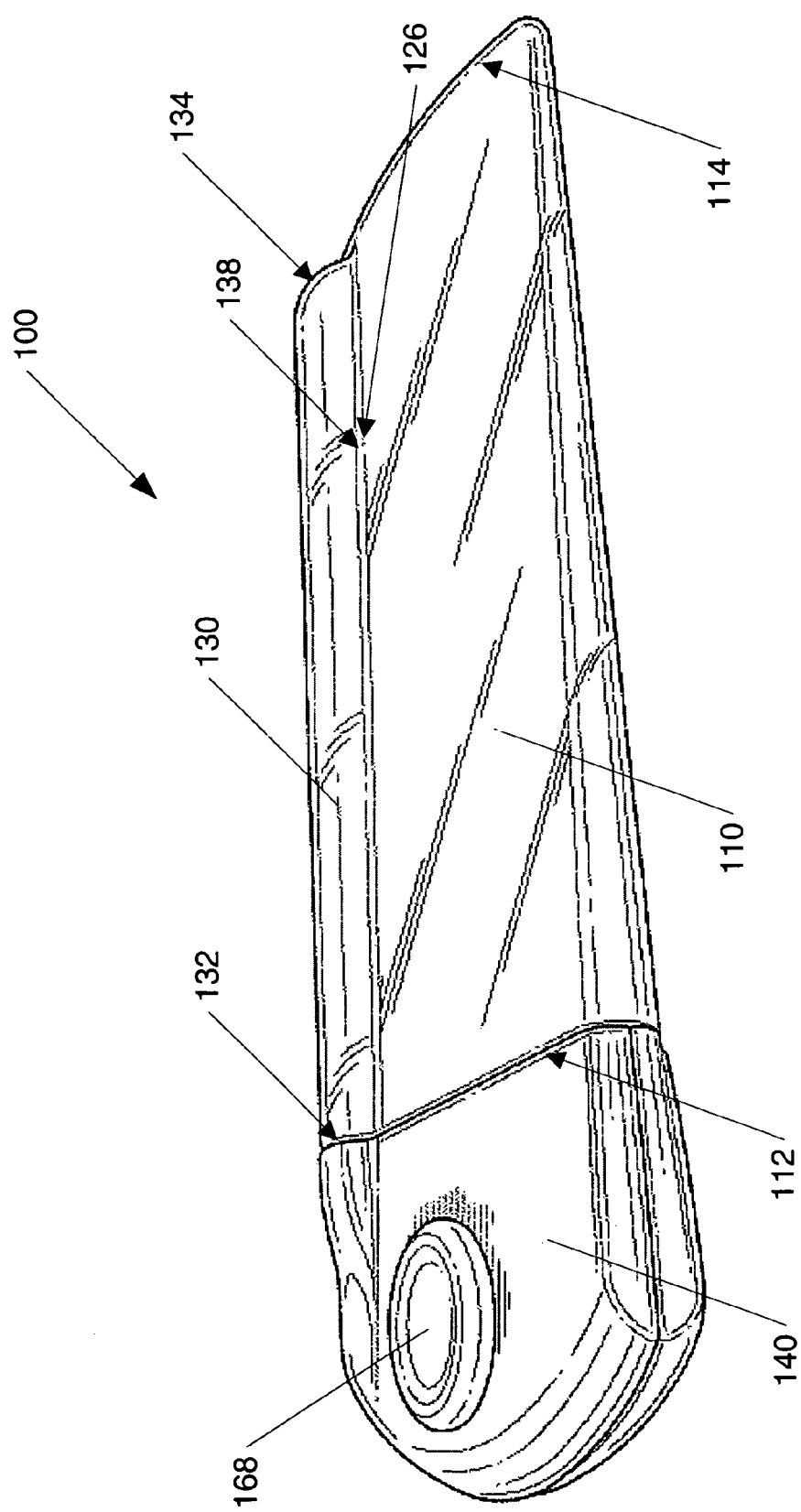
FIG. 1 illustrates a front perspective view of an exemplary embodiment of the present invention.

Referring to the accompanying drawings, FIG. 1 illustrates a front perspective view of a compact illumination and magnification device 100 in accordance with an exemplary embodiment of the present invention. The illumination and magnification device 100 has a light transmitting body 110, a magnifying lens 130, and a housing 140.

The light transmitting body 110 is dimensioned and configured to be portable and to overlie the surface, or a part of the surface, to be illuminated. Preferably, the light transmitting body 110, while compact, is conveniently dimensioned to direct light to a sufficient area of the surface so that the device 100 does not have to be moved repeatedly from one section of the surface to another in order to view the words, images, or information on the surface.

Preferably, the light transmitting body 110 is fabricated of certain thermoplastic resins, such as various acrylic and polycarbonate resins, which are known to have the inherent capability of conducting light throughout the material. The present invention, however, can utilize any other transparent material capable of conducting light, such as glass, and is not limited to the use of thermoplastic resins.

Advantageously, the light transmitting body 110 has a wedge shape, tapering from a thicker edge 112 to the opposite end of the light transmitting body 110 where a thinner edge 114 has a substantially reduced cross-sectional thickness. The light transmitting body 110 is thus configured to deflect a substantial portion of the conducted light within the light transmitting body 110 onto the underlying surface to be illuminated.

Figure 6:
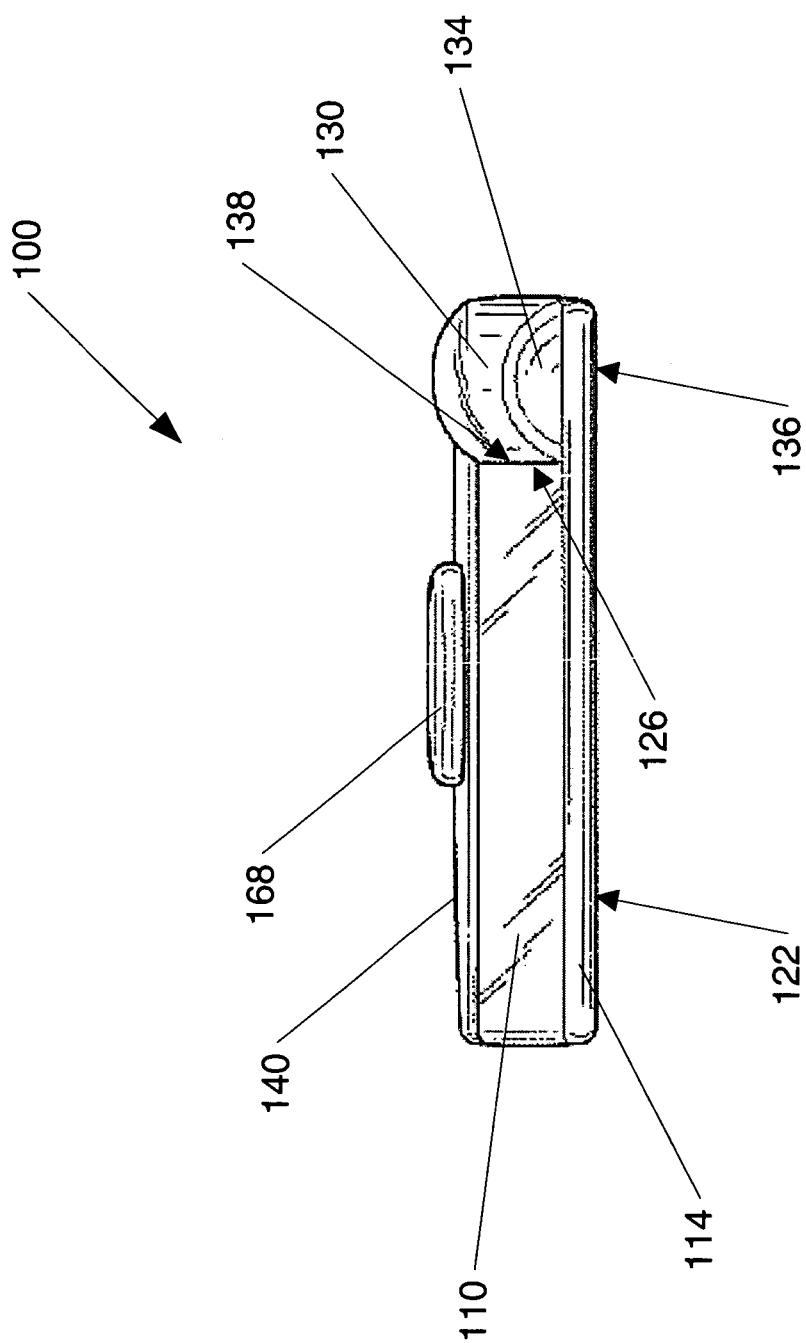
FIG. 6 illustrates another end view of the exemplary embodiment of the present invention shown in FIG. 1, showing the thinner edge of the wedge and barrel magnifier.

The magnifying lens 130, also shown in FIG. 1, is an elongate, semi-cylindrical lens, similar to a barrel magnifier. FIG. 6 further illustrates the semi-cylindrical shape of an embodiment of the magnifying lens 130. The present invention, however, can utilize other types of magnifying lenses, and is not limited to the use of the magnifying lens shown. The magnifying lens 130 is preferably made of a material with the inherent capability of conducting light throughout the material, such as a thermoplastic resin. Of course, the material for magnifying lens 130 must also enable the desired type of magnification.

As depicted in FIG. 1, the tapering side edge 126 of the light transmitting body 110 is adjacent to the elongated side 138 of the magnifying lens 130. In the most preferred embodiment, the light transmitting body 110 is integrally formed together with the magnifying lens 130. It is particularly advantageous to make the light transmitting body 110 and the magnifying lens 130 out of one piece of suitable material. For instance, a thermoplastic resin may be set in a single mold which provides shapes to form the light transmitting body 110 and the magnifying lens 130 together. Employing the same material for the magnifying lens 130 and the light transmitting body 110 facilitates manufacturing, and makes transition between the light transmitting body 110 and magnifying lens 130 seamless. A seamless transition has the added advantage of facilitating the transfer of light between the light transmitting body 110 and the magnifying lens 130, thus allowing a single light source to be employed to emit light.

Although the light transmitting body 110 is integrally formed with the magnifying lens 130 in the preferred embodiment, an alternative embodiment may secure a light transmitting body 110 to a separate magnifying lens 130. In this alternative embodiment, the light transmitting body 110 and the separate magnifying lens 130 can be secured together according various methods including, but not limited to, the use of adhesives, fasteners, welding, and mechanically interlocking parts. Moreover, the light transmitting body 110 and the separate magnifying lens 130 may be made from different materials.

Figure 2:
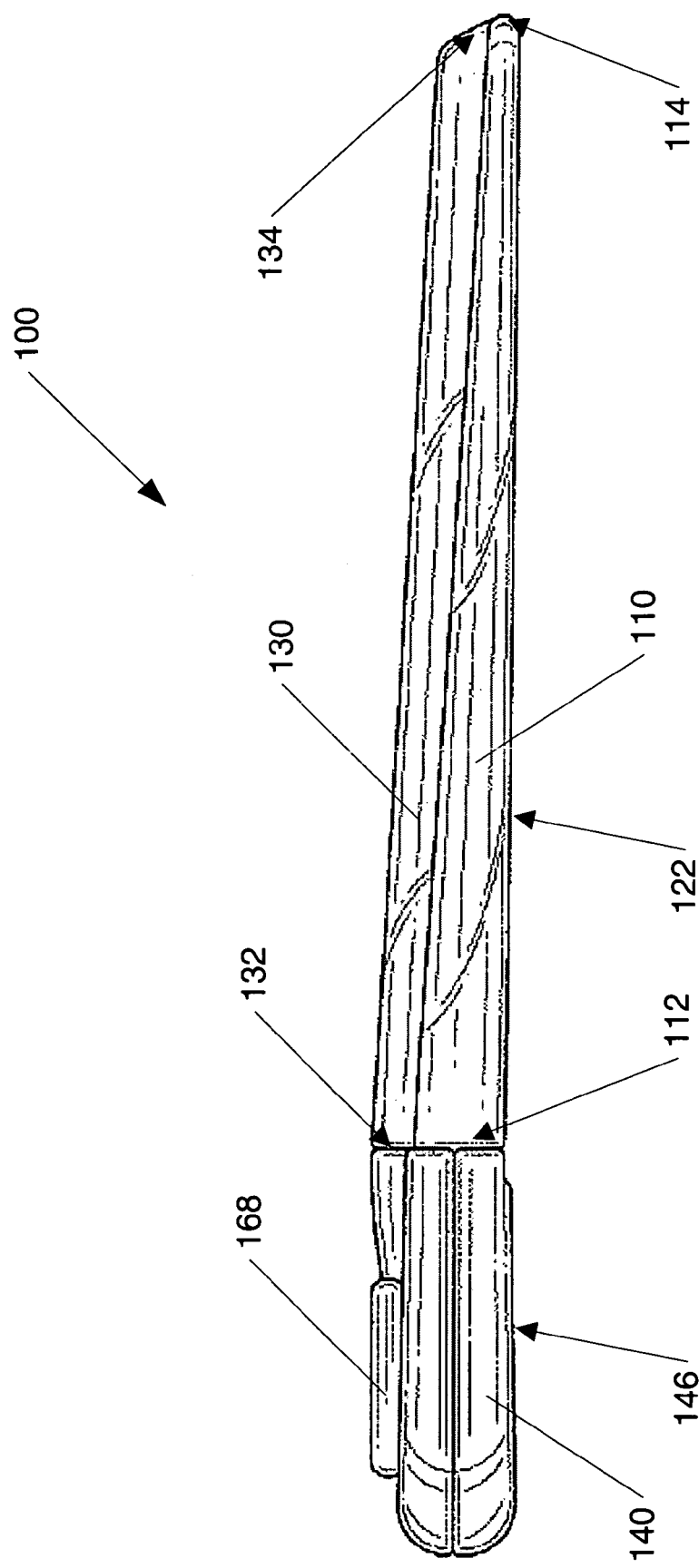
FIG. 2 illustrates a side view of the exemplary embodiment of the present invention shown in FIG. 1.
Figure 3:
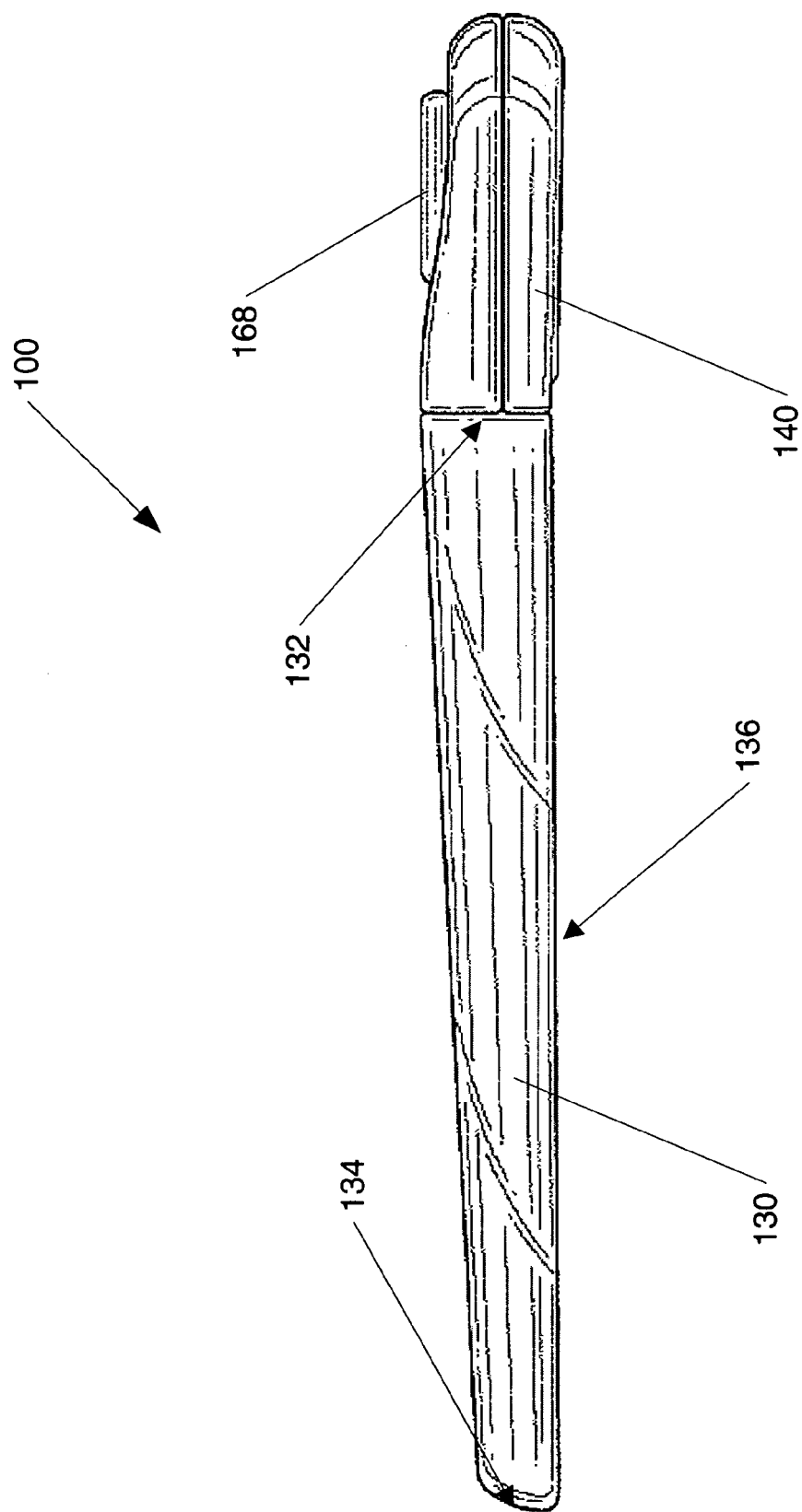
FIG. 3 illustrates another side view of the exemplary embodiment of the present invention shown in FIG. 1.

As illustrated in FIGS. 2 and 3, the magnifying lens 130 of the illustrated embodiment tapers from a thicker end 132 to a thinner end 134 having a substantially reduced cross-sectional thickness. As FIGS. 2 and 3 further illustrate, the thinner end 134 of the magnifying lens 130 is beveled to deflect light more effectively onto the magnified surface, and to prevent unwanted emission of light through the end 134. In general, the magnifying lens 130 is preferably configured to deflect a substantial portion of the conducted light within the magnifying body 130 onto the underlying surface to be magnified.

As further shown in FIGS. 2 and 3, another advantage is gained when the bottom surface 122 of the light transmitting body 110, the bottom surface 136 of the magnifying lens 130, and the bottom surface 146 of housing 140 are generally flat and substantially flush with one another so that the device 100 can lie flat on the surface to be viewed. Such configuration substantially minimizes the light that is reflected off the surface illuminated.

Figure 7:
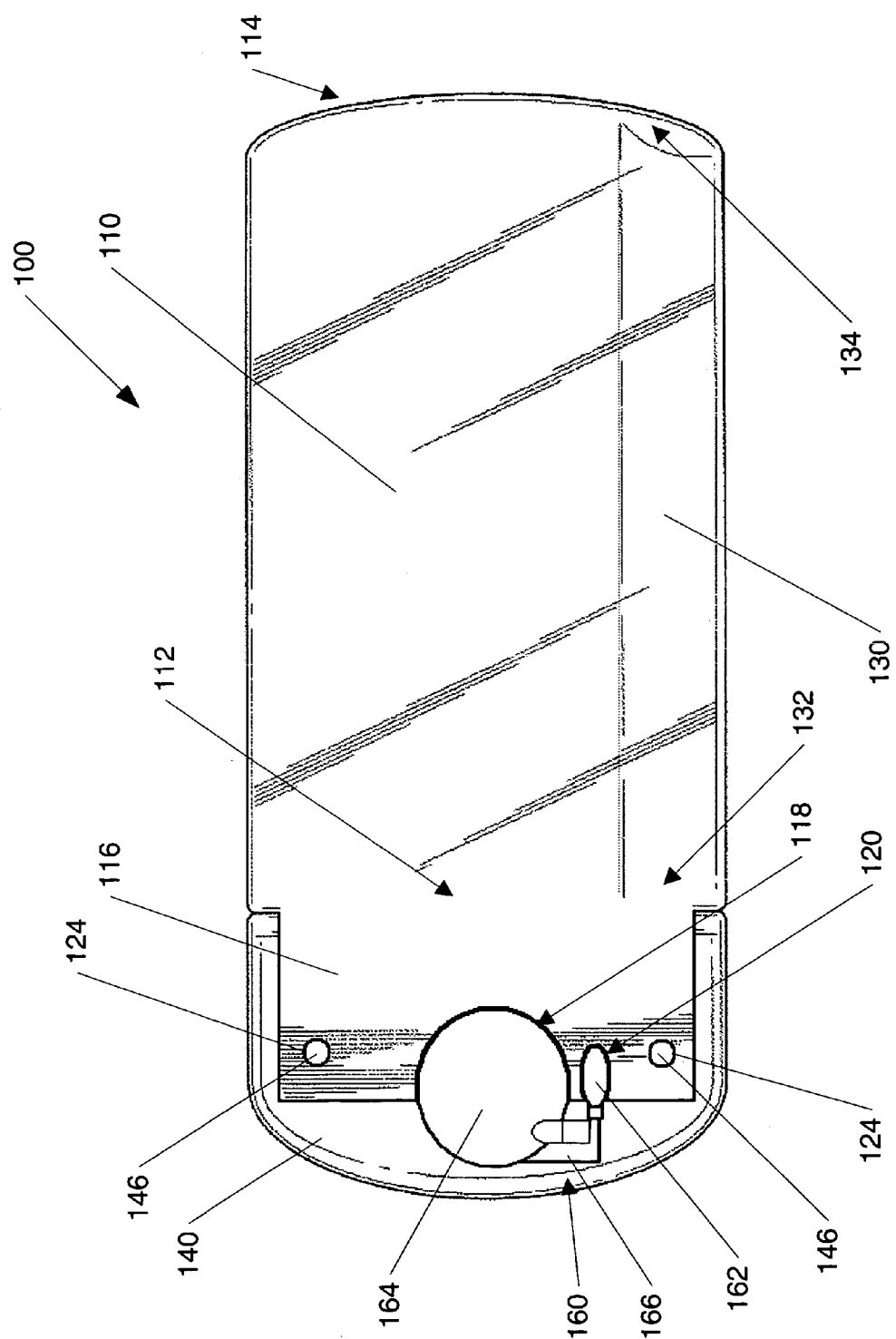
FIG. 7 illustrates a bottom view of the exemplary embodiment of the present invention shown in FIG. 1, with the housing cover removed so as to show the interior of the housing.

As shown in FIG. 7, the housing 140 is preferably implemented to be substantially hollow in order to receive, and be secured to, the thicker edge 112 of the light transmitting body 110 and the thicker edge 132 of the magnifying lens 130. FIG. 7 illustrates an exemplary manner for securing the light transmitting body 110 and the magnifying lens 130 to the housing 140. The integrally formed light transmitting body 110 and magnifying lens 130 has an extension 116 which is also made of the same transparent, light conductive, material as the transmitting body 110 and the magnifying lens 130. It is particularly advantageous to make the magnifying lens 130, the light transmitting body 110, and the extension 116 out of one piece of material. For instance, a thermoplastic resin may be set in a single mold which provides shapes to make the magnifying lens 130, the light transmitting body 110, and the extension 116. Thus, the three components 110, 116, and 130 are made of the same material and the transitions between them are seamless, facilitating the transmission of light therebetween.

As further illustrated in FIG. 7, the extension 116 has bores 124 which tightly engage pegs 146 which are attached to, and extend from, the inner surface of housing 140. The engagement between bores 124 and pegs 146 can be further reinforced by the use of adhesives. In general, however, various fastening devices, fastening mechanisms, and other joining methods can be implemented to secure the light transmitting body 110 and the magnifying lens 130 to the housing 140. Such methods include, but are not limited to, the use of adhesives, fasteners, welding, and other mechanically interlocking parts.

As also shown in the exemplary embodiment of FIG. 7, the light source arrangement 160 includes a single miniature light bulb 162 supported in the housing 140 proximate to the extension 116, the thicker edge 112 of the light transmitting body 110, and the thicker edge 132 of the magnifying lens 130. With the extension 116, the light transmitting body 110, and the magnifying lens 130 capable of transmitting light between each other, the single light bulb 162 may be employed to emit light into, and through, the extension 116, and both the light transmitting body 110 and the magnifying lens 130. Of course, FIG. 7 shows an exemplary embodiment only, and the present invention also contemplates one or more light sources positioned in proximity to different portions of the light transmitting body 110 and the magnifying lens 130. Moreover, alternative embodiments may have a light source 160 that only emits light into the light transmitting body 110 and not the magnifying lens 130, particularly if the light transmitting body 110 and the magnifying lens 130 are not integrally formed together.

Figure 4:
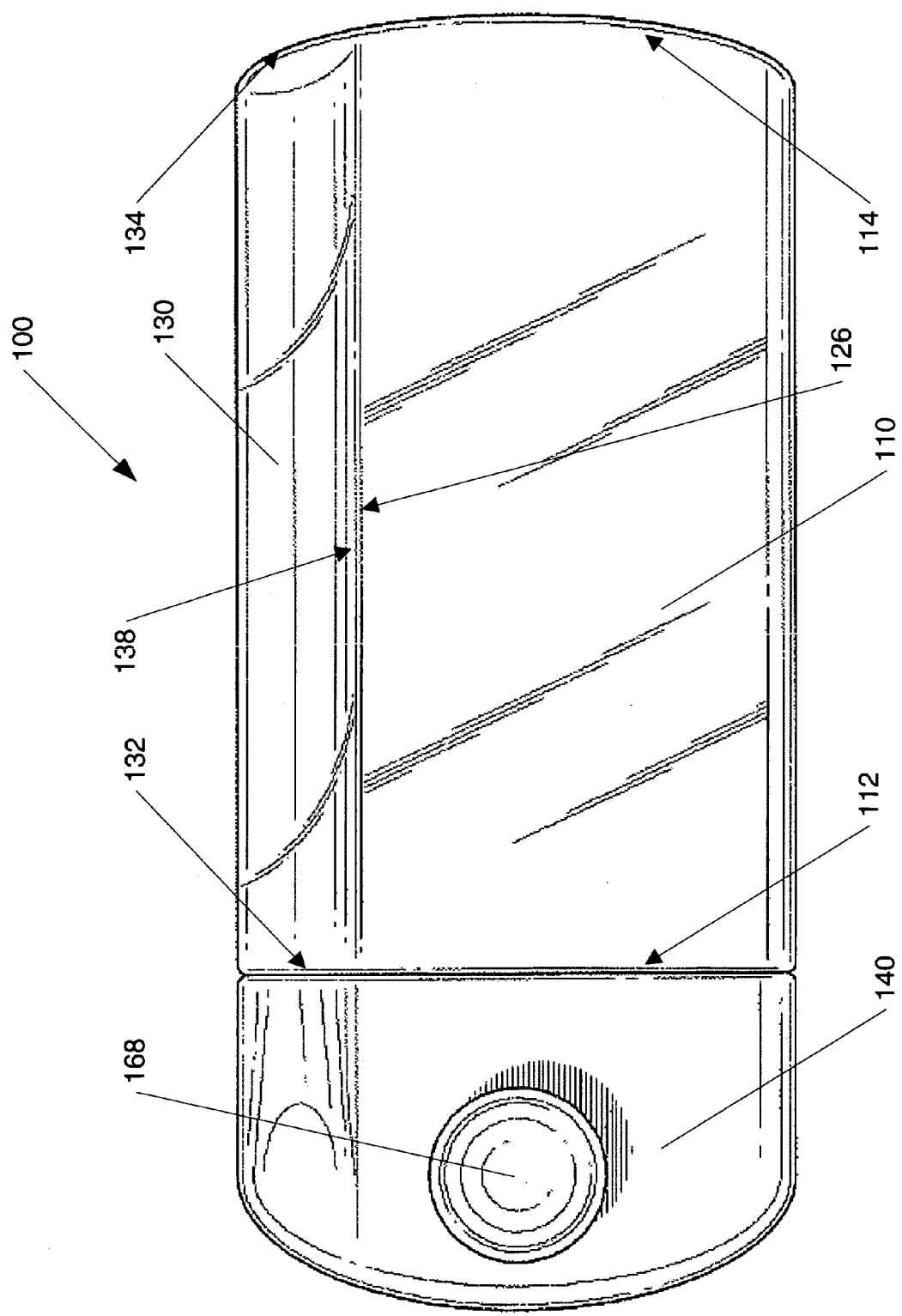
FIG. 4 illustrates a top view of the exemplary embodiment of the present invention shown in FIG. 1.
Figure 5:
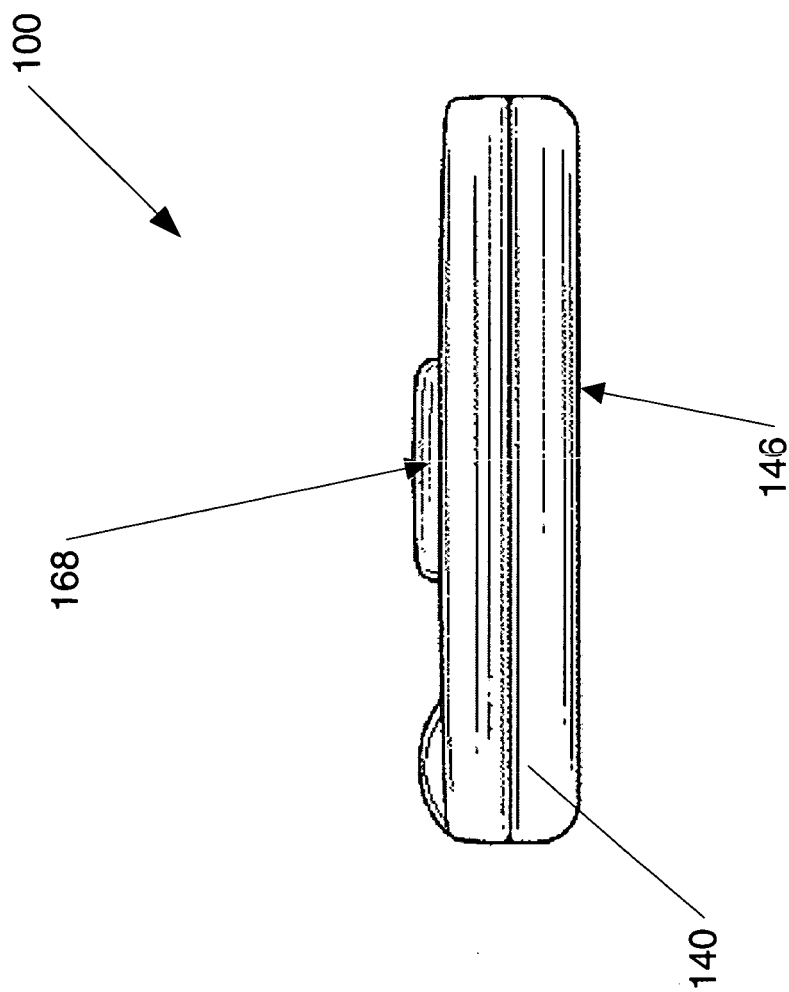
FIG. 5 illustrates an end view of the exemplary embodiment of the present invention shown in FIG. 1, showing the housing.

To selectively power the light bulb 162, a simple DC electrical circuit, indicated generally at 166 in embodiment of FIG. 7, connects the light bulb 162 in series with the storage battery 164 and the manual on-off switch 168 (shown in FIGS. 1 and 4). In general, however, the light source arrangement 160 may include any suitable combination of components capable of generating visible light.

As shown in FIG. 7, the extension 116 of the illustrated embodiment has a recess 120 to receive, and substantially surround, the light bulb 162. Advantageously, the light bulb has a frosted globe, and the edge of the recess 120 which receives the bulb is textured to diffuse the light from the bulb. Using frosted globes and textured recess edges prevents noticeable streaks or beams of light, and promotes even transmission of light through the light transmitting body 110 and the magnifying lens 130. Although the embodiment shown in FIG. 7 shows the single recess 120 and the single light bulb 162, the present invention may more generally implement a plurality of light bulbs. With a plurality of bulbs, the light transmitting body 110 or the magnifying lens 130 may have a recesses configured to receive each light bulb and substantially surround the bulb to promote more effective transmission of light from the bulb.

As further illustrated in FIG. 7, the extension 116 has a recess 118 which surrounds a portion of the power source 164 to make the device 100 more compact. In general, the housing 140 is preferably configured as compactly as possible to occupy a minimal portion of the top surface area of the illumination and magnification device 100.

The operation of the illumination and magnification device 100 may be easily understood by the following example as also illustrated in FIG. 7. Upon manual actuation of the switch 168 (shown in FIGS. 1 and 4) to close the electrical circuit 166, the power source 164 supplies electrical power to energize the light bulb 162 to emit visible light. The housing 140 is enclosed and preferably made of an opaque material. The emitted light directed through the light transmitting body 110 and the magnifying lens 130 is utilized for illumination. In particular, due to the immediate proximity of the light bulb 162 to the extension 116, the light is substantially conducted through the extension 116, into the light transmitting body 110 toward the thinner edge 114, and into the magnifying lens 130 toward the thinner edge 134. However, due to the tapering wedge shape of the light transmitting body 110, a substantial amount of light is deflected downwardly through the bottom surface 122 (shown in FIG. 2) of the light transmitting body 110. Similarly, due to the tapering wedge shape of the magnifying lens 130 and the beveled thinner edge 134, a substantial amount of light is deflected downwardly through the bottom surface 136 (shown in FIG. 3) of the magnifying lens 130. Thus, the light conducted through the light transmitting body 110 and the magnifying lens 130 is substantially applied directly, and primarily, to the underlying surface.

Figure 8:
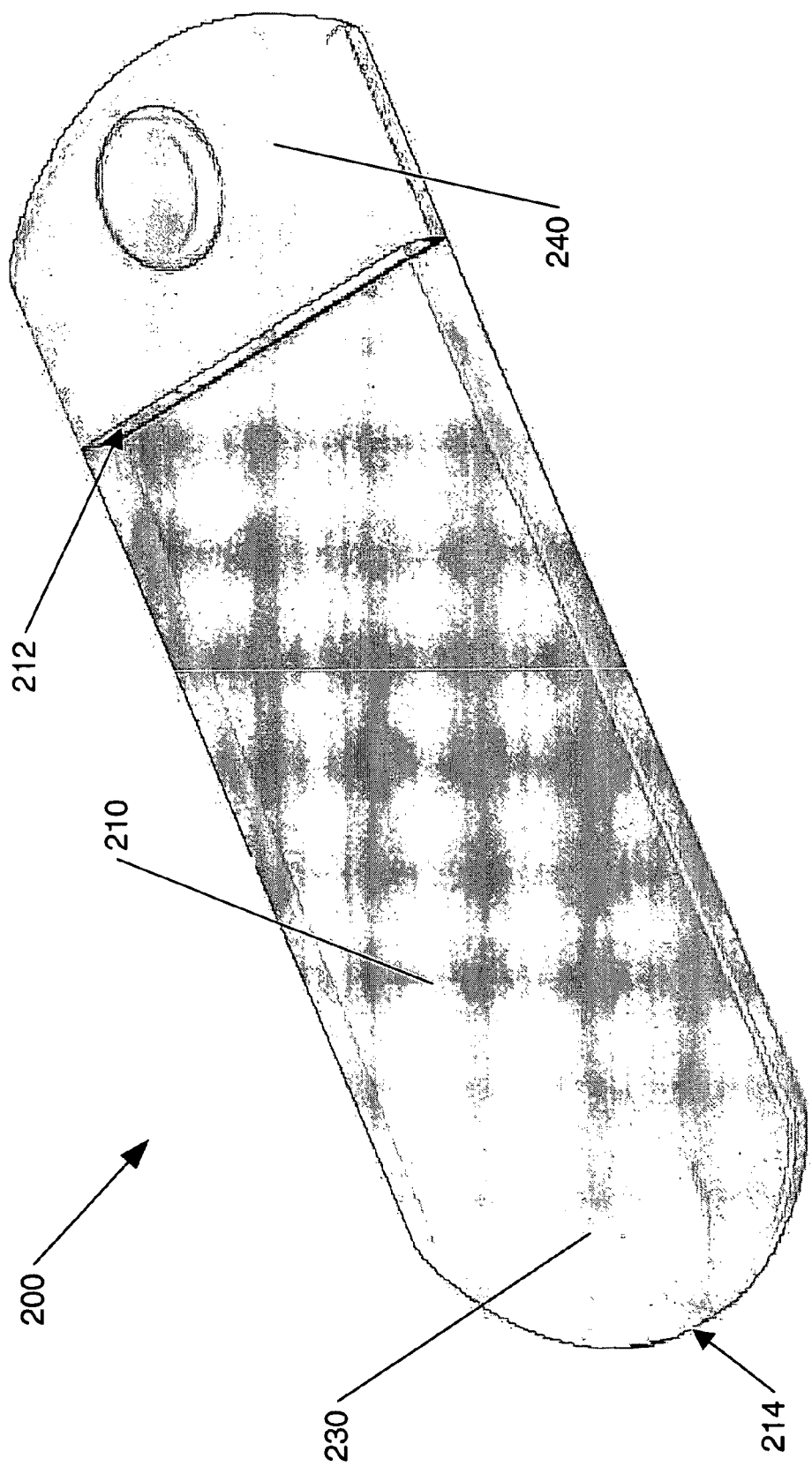
FIG. 8 illustrates another exemplary embodiment of the present invention.

As described previously, the present invention can utilize other types of magnifying lenses, and is not limited to the use of the elongate, semi-cylindrical magnifying lens 130 illustrated in FIGS. 1-7. For instance, FIG. 8 illustrates a front perspective view of another exemplary embodiment of the present invention using a different type of magnifying lens. As shown in FIG. 8, the compact illumination and magnification device 200 employs a convex magnifying lens 230 with a light transmitting body 210 and a housing 240.

The magnifying lens 230 in FIG. 8 is a circular convex magnifying lens, positioned within the light transmitting body 210 towards the edge 214. The magnifying lens 230 is dimensioned to magnify a sufficient area of the underlying surface. Preferably, the magnifying lens 230 is fabricated of certain thermoplastic resins, such as various acrylic and polycarbonate resins, which are known to have the inherent capability of conducting light throughout the material. As described previously, the present invention, however, can utilize any other transparent material capable of conducting light, such as glass, and is not limited to the use of thermoplastic resins. Of course, the material for magnifying lens 230 must also enable the desired type of magnification.

The light transmitting body 210 in FIG. 8 is dimensioned and configured to be portable and to overlie the surface, or a part of the surface, to be illuminated. Preferably, the light transmitting body 210, while compact, is conveniently dimensioned to direct light to a sufficient area of the surface. The light transmitting body 210 is also fabricated of a material with the inherent capability of conducting light throughout the material, such as a thermoplastic resin.

As also shown in FIG. 8, the light transmitting body 210 surrounding the magnifying glass 230 has a general wedge shape, tapering from a thicker edge 212 to the opposite end of the light transmitting body 210, where a thinner edge 214 has a substantially reduced cross-sectional thickness. The light transmitting body 210 is thus configured to deflect a substantial portion of the conducted light within the light transmitting body 210 onto the underlying surface to be illuminated. The housing 240, holding a light source and power source (not shown), is secured to the light transmitting body 210 at the thicker edge 212.

Preferably, the light transmitting body 210 and the magnifying lens 230 illustrated in FIG. 8 are made out of one piece of suitable material and integrally formed. For instance, a thermoplastic resin may be set in a single mold which provides shapes to form the light transmitting body 210 and the magnifying lens 230 together. Thus, the transition between the light transmitting body 210 and magnifying lens 230 is seamless, facilitating the transfer of light between the light transmitting body 210 and the magnifying lens 230. This seamless transition allows a light source in the housing 240 to emit light into both the light transmitting body 210 and the magnifying lens 230, even though the light source is only adjacent to the light transmitting body 210.

It will therefore be readily understood by those persons skilled in the art that the present invention is susceptible of broad utility and application. Many embodiments and adaptations of the present invention other than those herein described, as well as many variations, modifications and equivalent arrangements, will be apparent from, or reasonably suggested, by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A device for illumination and magnification, the device comprising:
    a light transmitting body having a wedge-shape tapering from a thicker edge to a thinner edge;
    a magnifying lens integrally formed with the light transmitting body, the magnifying lens and the light transmitting body being formed of a transparent light conductive material;
    a light source positioned at the thicker edge of the light transmitting body, the light source emitting light into the light transmitting body and the magnifying lens; and
    a housing secured to the light transmitting body, the housing being positioned at the thicker edge of the light transmitting body and housing the light source,
    wherein an extension extending from the light transmitting body secures the housing to the light transmitting body, and the extension has a recess that at least partially surrounds the light source.

2. The device for illumination and magnification of claim 1, further comprising a power source that provides power to the light source.

3. The device for illumination and magnification of claim 1, wherein the housing is further secured to the magnifying lens.

4. The device for illumination and magnification of claim 1, wherein the magnifying lens is a convex magnifying lens.

5. The device for illumination and magnification of claim 1, wherein the magnifying lens is elongate in shape.

6. The device for illumination and magnification of claim 5, wherein the magnifying lens is adjacent to a tapering side edge of the light transmitting body.

7. The device for illumination and magnification of claim 5, wherein the magnifying lens is semi-cylindrical in shape.

8. The device for illumination and magnification of claim 5, wherein the magnifying lens has a wedge-shape tapering from a thicker edge to a thinner edge.

9. The device for illumination and magnification of claim 8, wherein the thinner edge of the magnifying lens is beveled.

10. The device for illumination and magnification of claim 3, wherein the extension further extends from the magnifying lens, and the extension secures the housing to the light transmitting body and the magnifying lens.

11. The device for illumination and magnification of claim 1 or 10, wherein the extension and the housing are secured together with mating projections and receptacles.

12. The device for illumination and magnification of claim 2, wherein the extension has a recess that receives at least a portion of the power source.

13. The device for illumination and magnification of claim 1, wherein the transparent light conductive material is a thermoplastic resin.

14. The device for illumination and magnification of claim 1, wherein a bottom surface of the device is substantially flat.

15. A device for illumination and magnification, the device comprising:
    a light source;
    a light transmitting body formed of a transparent light conductive material, the light transmitting body having a wedge-shape tapering from a thicker edge to a thinner edge;
    a magnifying lens secured to the light transmitting body, and
    a housing secured to at least one of the light transmitting body or the magnifying lens,
    wherein an extension extending from the light transmitting body secures the housing to the light transmitting body and the extension has a recess that at least partially surrounds the light source.

16. The device for illumination and magnification of claim 15, wherein the light source is positioned at the thicker edge of the light transmitting body, the light source emitting light into the light transmitting body.

17. The device for illumination and magnification of claim 16, further comprising a power source for powering the light source.

18. The device for illumination and magnification of claim 17, wherein the housing is positioned at the thicker edge of the light transmitting body and housing the light source and the power source.

19. The device for illumination and magnification of claim 15, wherein the magnifying lens is a convex magnifying lens.

20. The device for illumination and magnification of claim 15, wherein the magnifying lens is elongate in shape.

21. The device for illumination and magnification of claim 20, wherein the magnifying lens is adjacent a tapering side edge of the light transmitting body.

22. The device for illumination and magnification of claim 20, wherein the magnifying lens is semi-cylindrical in shape.

23. The device for illumination and magnification of claim 20, wherein the magnifying lens has a wedge-shape tapering from a thicker edge to a thinner edge.

24. The device for illumination and magnification of claim 23, wherein the thinner edge of the magnifying lens is beveled.

25. The device for illumination and magnification of claim 15, wherein the extension and the housing are secured together with mating projections and receptacles.

26. The device for illumination and magnification of claim 17, wherein the extension has a recess that receives at least a portion of the power source.

27. The device for illumination and magnification of claim 15, wherein the transparent light conductive material is a thermoplastic resin.

28. The device for illumination and magnification of claim 15, wherein a bottom surface of the device is substantially flat.

29. A device for illumination and magnification, the device comprising:
    a light transmitting body having a wedge-shape tapering from a thicker edge to a thinner edge;
    a magnifying lens integrally formed with the light transmitting body, the magnifying lens and the light transmitting body being formed of a transparent light conductive material;
    a light source positioned at the thicker edge of the light transmitting body, the light source emitting light into the light transmitting body and the magnifying lens;
    a power source that provides power to the light source; and
    a housing secured to the light transmitting body, the housing being positioned at the thicker edge of the light transmitting body and housing the light source,
    wherein an extension extending from the light transmitting body secures the housing to the light transmitting body, and the extension has a recess that receives at least a portion of the power source.

30. A device for illumination and magnification, the device comprising:
    a light source;
    a power source for powering the light source;
    a light transmitting body formed of a transparent light conductive material, the light transmitting body having a wedge-shape tapering from a thicker edge to a thinner edge;
    a magnifying lens secured to the light transmitting body, and
    a housing secured to at least one of the light transmitting body or the magnifying lens,
    wherein an extension extending from the light transmitting body secures the housing to the light transmitting body, and the extension has a recess that receives at least a portion of the power source.

* * * * *

UNITED STATES PATENT AND TRADEMARK OFFICE
CERTIFICATE OF CORRECTION

PATENT NO. : 7,575,329 B2  Page 1 of 1
APPLICATION NO. : 11/305352
DATED : August 18, 2009
INVENTOR(S) : James F. Bennett, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 751 days.

Signed and Sealed this

Seventh Day of September, 2010

David J. Kappos
*Director of the United States Patent and Trademark Office*